United States Patent

Grills et al.

[11] Patent Number: 5,133,212
[45] Date of Patent: Jul. 28, 1992

[54] METHOD AND APPARATUS FOR MEASURING THE LIQUID LEVEL OF A CONTAINMENT TANK SUBJECT TO EXTERNAL FORCES

[75] Inventors: Laurence M. Grills, Mission Viejo; Robert Kamenoff, Wildomar, both of Calif.

[73] Assignee: Kaiser Aerospace and Electronics Corp., Foster City, Calif.

[21] Appl. No.: 745,063

[22] Filed: Aug. 12, 1991

[51] Int. Cl.⁵ ............................................. G01F 23/20
[52] U.S. Cl. ..................................... 73/296; 364/567
[58] Field of Search ................. 73/296; 340/613, 618; 364/556, 567

[56] References Cited

U.S. PATENT DOCUMENTS

| | | | |
|---|---|---|---|
| 4,739,494 | 4/1988 | Torii | 364/567 |
| 4,854,406 | 8/1989 | Appleton et al. | 177/139 |
| 5,016,197 | 5/1991 | Neumann et al. | 364/550 |

FOREIGN PATENT DOCUMENTS 2548365  1/1985  France .................................. 73/296

Primary Examiner—William A. Cuchlinski, Jr.
Assistant Examiner—W. Morris Worth
Attorney, Agent, or Firm—Marvin H. Kleinberg

[57] ABSTRACT

A detection system for determining the level of a liquid in a containment tank includes a containment tank and a reference standard of known weight mounted to the vehicle and movable along the yaw axis of the vehicle. Load cells are placed intermediate the tank and reference standard to provide analog voltage outputs in proportion to the load on each cell. The load cell outputs, when amplified, summed and then divided by the output of the reference weight load cell, provide an electronic signal that is proportional to the gross weight of the tank. A pre-set signal, representative of the empty weight of the tank, is subtracted from the gross weight signal, resulting in a signal which is proportional to the net weight, or the contents of the tank.

11 Claims, 4 Drawing Sheets

STRAIGHT AND LEVEL. ACCELERATING $$\text{GROSS WEIGHT} = \frac{W}{G} = \frac{500 \text{ LBS}}{1G} = 500 \text{ LBS}$$

CONSTANT RATE OF CLIMB $$\text{GROSS WEIGHT} = \frac{W}{G} = \frac{400 \text{ LBS}}{0.8 G} = 500 \text{ LBS}$$

METHOD AND APPARATUS FOR MEASURING THE LIQUID LEVEL OF A CONTAINMENT TANK SUBJECT TO EXTERNAL FORCES

BACKGROUND OF THE INVENTION

1. Field of the Invention

This invention relates in general to measuring and detection systems, and, more particularly, to a measuring and detection system for determining the quantity of a liquid stored in a tank subject to external forces.

2. Description of the Related Art

The present invention is principally directed toward a new and innovative system for measuring the liquid volume present and therefore the liquid level in, but not limited to, an aircraft or moving vehicle liquid containment vessel or holding tank that may contain solely liquid, or liquid mixed with solid or particulate waste.

Present systems for measuring the liquid present in such a tank employ either pressure differential techniques or capacitor proximity sensor techniques. Both of these types of prior art systems are vulnerable to errors due to fouled or clogged sensors induced by the necessity to operate the sensing elements in direct contact with the mixture held in the tank. These system errors are of such a magnitude that the system becomes inoperative in a relatively short period of time and the sensors must be either serviced and/or replaced frequently.

OBJECTS AND SUMMARY OF THE INVENTION

Accordingly, it is an object of the present invention to provide a measuring and detection system for determining the quantity or weight of a liquid in a tank that is subject to external forces, such as a tank in an airborne aircraft or in a moving vehicle, that eliminates the errors caused by fouled or clogged sensors operating in direct contact with the contents of the tank.

It is still another object of the present invention to provide a measuring and detecting system for determining the level of a liquid in a tank that is subject to external forces, such as a tank in an aircraft or a moving vehicle, that is reliable in operation so as to require minimal servicing to maintain the system in proper operating order.

Among the believed novel aspects embodied in the present invention is that a system, constructed in accord with the present invention, utilizes load cells and/or strain gauges to measure the tank contents by weight. While measuring the volume or level of a liquid in a containment tank by weight is not new per se, the particular structure and method of the present invention for measuring the volume of liquids containing contaminates on a moving vehicle appears to be unique.

The present invention also provides for measuring and compensating for increased and/or decreased gravitational forces or inertial forces that may be exerted upon the liquid and any contained contaminates resulting from the movement of the vehicle or tank by using a method that is not found in known prior art.

Akin to the immediately preceding point, the present invention provides a system that generally compensates for external forces acting upon the tank and its contents so as to correct inaccuracies caused by the effects of lateral forces or the tilting of the tank. The present invention provides a system which does so by the positioning and orientation of the system sensors.

In general, the present invention is directed towards an apparatus for measuring the volume or level of a liquid in a containment tank in a vehicle that is subject to external forces caused by movement of the vehicle, and includes a tank and reference standard mounted to the vehicle but having a degree of freedom along the yaw or vertical axis of the vehicle, at least one tank strain gauge load cell and at least one reference strain gauge load cell, each of which is sensed by a direct current voltage detector which provides analog voltage outputs proportional to the load on each load cell. The tank load cells are placed intermediate different portions of the containment tank and a solid portion of a common reference surface of the vehicle, while the reference strain gauge load cells are placed intermediate a reference standard of known weight and a portion of the common reference surface of the vehicle.

All cells are aligned to be sensitive generally parallel along an axis substantially normal to the common reference surface and generally parallel to the yaw or vertical axis of the vehicle, that is, generally parallel along the axis of freedom of both the tank and the reference standard. A computational device converts the analog signals essentially simultaneously into output information representative of the volume or level of the liquid in the containment tank by summing the plurality of tank load cell outputs to form a tank gauge sum signal, dividing that quantity by the output of the reference load cell output to generate a tank gross weight signal, and then subtractively combining the known tank empty weight signal from the tank gross weight signal to arrive at a tank net weight signal.

Still further, the invention includes methods for determining the volume or level of a liquid in a tank in both static and dynamic conditions as will be better described below.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

Figure 1:
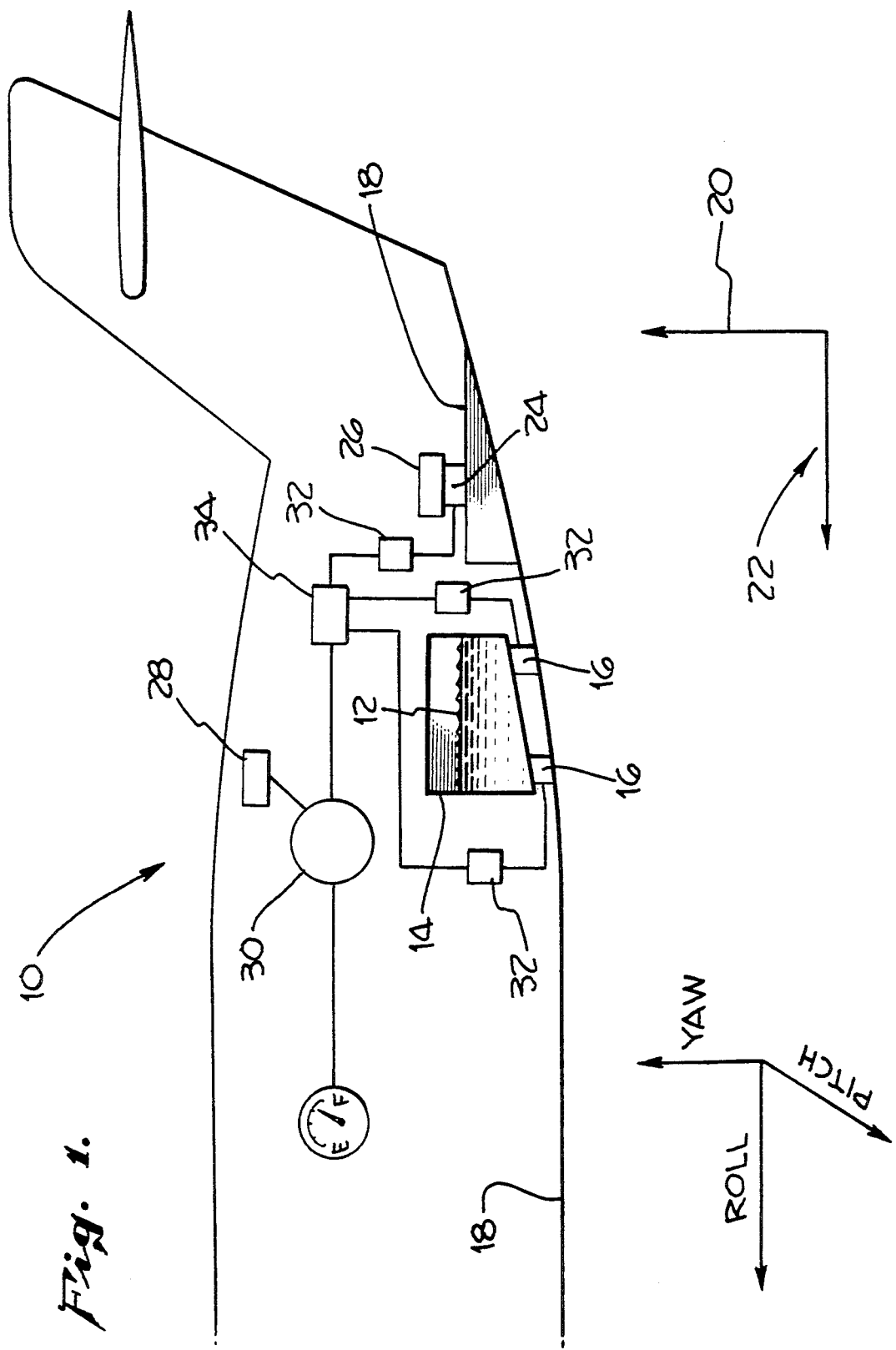
FIG. 1 is an idealized schematic showing a system in accord with the present invention.

Referring now to the drawings, FIG. 1 illustrates, in an idealized schematic form, an apparatus 10 constructed in accord with the present invention for use in measuring the volume or level of a liquid 12 in a containment tank 14 that is subject to external forces caused by movement of tank 14. Tank 14 may be a waste holding tank or the like which may contain solid contaminants, or even a fuel tank containing only liquids, such as is found in an aircraft or other moving vehicle.

At least one, and preferably a plurality, of tank strain gauge load cells 16 are provided for tank 14, as described below. These strain gauge load cells 16 normally operate in either compression or tension mode in response to external load forces acting on the cell in conjunction with applied direct current voltage signals to provide analog voltage outputs that correspond, in known proportion, to the load forces applied to each load cell 16. Tank load cells 16 are placed intermediate different portions of containment tank 14 and a solid or rigid portion of a common reference surface 18 of the vehicle, which, in the preferred embodiment, is the aircraft frame. Load cells 16 are aligned to be sensitive to load forces generally parallel along an axis 20 that is substantially normal to the common reference surface 18. In most instances, the axis 20 will be parallel to a vertical axis, or to an axis that is normal to the axis of usual forward motion of the tank or vehicle. As an example, in an aircraft, tank load cells 16 will normally be placed so as to be sensitive along the yaw or vertical axis of the aircraft.

To provide a reference standard for the computations described below, at least one reference strain gauge load cell 24 is placed intermediate a reference standard 26 of known weight and a portion of common reference surface 18. Load cell 24 provides an analog voltage output in proportion to the load on the load cell as was described above for cells 16. Load cell 24 is, like cells 16, also aligned to be sensitive to load forces generally parallel along an axis that is substantially normal to the common reference surface 18, preferably the same axis as that of cells 16, for example, both cells 16 and cell 24 may be aligned to be sensitive along the yaw or vertical axis of an aircraft. In fact, for space and convenience considerations, both the tank 14 and the reference standard 26 may be stacked as illustrated in FIG. 7 and described below along a common yaw axis.

Referring once again to FIG. 1, device 28 retains data descriptive of the known tank empty weight for use as better described below in determining the level of liquid in the tank. Simple devices that may be used would include voltage dividers or variable resistors such as trim potentiometers used in conjunction with summing amplifiers that may be selectively chosen to electrically represent the known tank empty weight. More complicated devices for use with systems employing a central processor may include a Random Access Memory or Read-Only Memory device, operatively coupled with a central processing unit in the usual fashion that include data representing the known tank empty weight.

Figure 2:
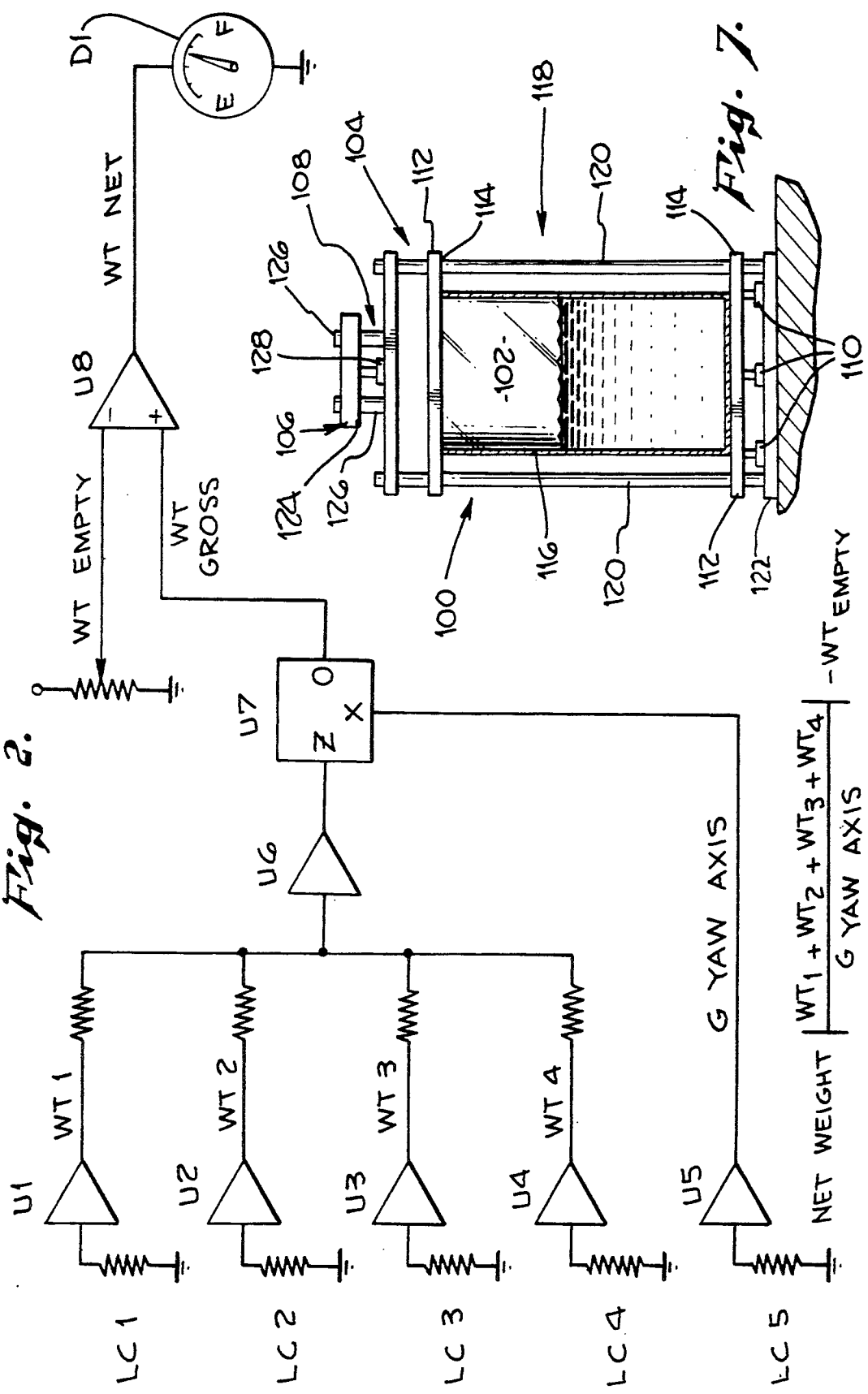
FIG. 2 is a schematic system block diagram showing a system in accord with the present invention.

A computational device 30, such as a central processing unit (or an equivalent circuit formed from a coupled series of operational amplifiers as illustrated in FIG. 2), is connected to receive the analog voltage outputs from load cells 16 and load cell 24, and converts these analog signals, essentially simultaneously, into output information of the volume or level of the liquid in the containment tank. The plurality of tank load cell outputs are summed to form a tank gauge sum signal, and this sum is divided by the output of the reference load cell output to form a tank gross weight signal, from which is subtracted the known tank empty weight to form a tank net weight signal. This signal is then used to generate a liquid volume or level signal based on known weightz volume relationships.

The preferred embodiment of a system in accord with the present invention would further includes a device 32 for electrically averaging out short term transients appearing in the analog voltage output signals from the load cells 16 as a result of inertial forces caused by the contents of the tank 14. This would eliminate measurement errors caused by "sloshing" of the liquid 12 in the tank 14 due to shprt term or violent movements of the tank 14 itself and the inertia inherent in a dynamically moving contained liquid 12.

The present invention may also be found in a system as illustratd in the system schematic FIG. 2 that incorporates instead of a microprocessor, equivalent logic represented by a circuit including a plurality of tank strain gauge load cell amplifiers, such as operational amplifiers, connected to the analog voltage outputs of the load cells.

In which an equivalent circuit, an analog multiplier device would be coupled with the tank strain gauge and with the reference load cell amplifiers. The load cell amplifier outputs are summed and divided by the analog voltage output of reference load cell to produce a tank gross weight signal.

Likewise, a subtraction amplifier would be coupled with the analog multiplier and a variable resistor network representing the known tank empty weight for subtracting a signal representing the known tank empty weight from the signal representing the tank gross weight to form a tank net weight signal, and to convert that tank net weight signal to a quantity representing the level or volume of liquid in the tank.

Both this equivalent circuit and each of these amplifier devices are described in further detail below in connection with FIG.2.

Finally, to present the signal representing the volume or level of the liquid in the tank to a human or other observer, it is preferred that at least one tank liquid level readout device 34, such as a dial, LCD or LED display, be operatively linked to computational device 30 for displaying the volume and/or level of the liquid contained in the tank. This device may also record this data for readout at a later date, or store the information for use by other devices.

Another embodiment of a system in accordance with the present invention would include the conversion of the analog voltage output signals from the load cells to a digital form for further processing in a central processing unit. Accordingly, a system of this alternate preferred embodiment would require an analog-to-digital converter which, in any of the usual ways, converts the analog voltage signal outputs from the load cells into digital signals for processing by the computational device of the system.

The present invention also includes a method for measuring the level of a liquid in a containment tank subject to external forces caused by movement of the tank. This method would include the steps of:

Mounting a containment tank to the vehicle so that it is movable along the yaw or vertical axis of the vehicle.

Mounting a reference standard of known weight to the vehicle so that it is movable along the yaw or vertical axis of the vehicle similar to that for the containment tank described immediately above.

Placing a plurality of tank strain gauge load cells sensed by direct current voltage devices, each providing an analog voltage output signal in proportion to the load on each load cell intermediate different portions of the containment tank and a solid portion of a common reference surface. Each of these cells is aligned to be sensitive to load forces generally parallel along the yaw or vertical axis of the vehicle.

Placing at least one reference strain gauge load cell sensed by direct current voltage means providing analog voltage outputs in proportion to the load on the load cell intermediate a reference standard of known weight and a portion of common reference surface, and aligned to be sensitive to load forces generally parallel along the yaw or vertical axis of the vehicle; and, Converting the analog signals from the load cells, essentially simultaneously, into output information of the liquid level of the containment tank by summing the plurality of tank load cell outputs to form a sum, dividing this sum by the output of the reference load cells to form a tank gross weight, and then subtracting the known tank empty weight from the tank gross weight to form a tank net weight; and, converting the calculated tank net weight into a corresponding volume or level of liquid contained in the tank by any of the known methods of ratio and proportion.

In an alternate method, the step of converting the analog voltage outputs from the load cells into digital signals is added, and the above method is carried out in the digital instead of the analog domain.

FIG. 2 shows in generalized schematic block form a system in accord with the present invention as briefly described above. In this drawing the tank is mounted on four load cells LC1 through LC4 oriented such that they measure the downward force of the tank along the yaw axis of an aircraft. A fifth load cell LC5 measures the downward force of a known reference weight, also along the yaw axis.

The analog voltage outputs from each of the load cells LC1 through LC4, supporting the tank, are amplified by operational amplifiers U1 through U4 and then summed in operational amplifier U6. The analog voltage output of load cell LC5, measuring the downward force of the reference weight, is amplified by U5. The analog multiplier U7 divides the output of U6 by the output of U5, resulting in the tank gross weight. Amplifier U8 subtracts the known tank empty weight from the gross weight resulting in the net percent of capacity on display device D1.

FIGS. 3 through 6, with reference to the circuit illustrated in FIG. 2, illustrate various conditions the system 10 might encounter in a tank located in an aircraft undergoing flight and will now be described.

Figure 3:
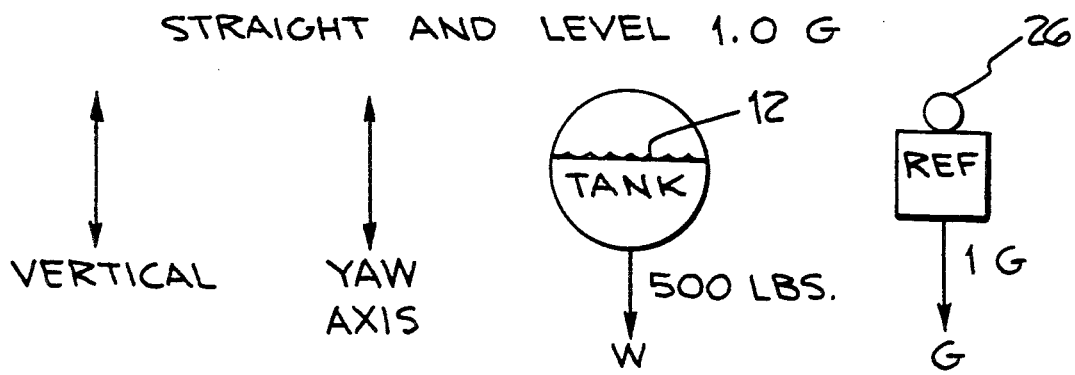
FIGS. 3 through 6 are vector analysis diagrams showing a vector diagram of various external forcing acting on the tank and liquid and the resolution of such forces in a system in accord with the present invention; and, FIG. 7 illustrates a preferred tank assembly for use in a system in accord with the present invention.
Figure 4:
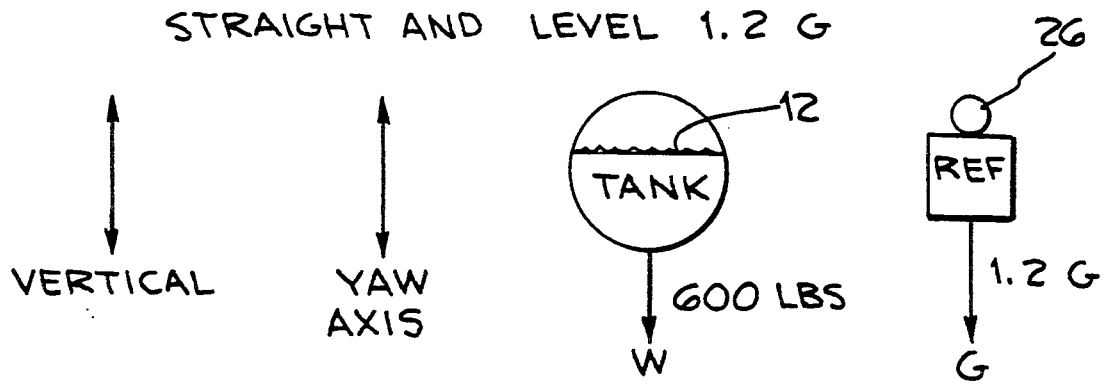

FIGS. 3 and 4 show the system in straight and level flight with the downward force of the tank along the aircraft yaw axis. As a result, the sum of load cells LC1 through LC4 provide a direct readout of the gross weight of the tank. Similarly, load cell LC5 provides a direct readout of the reference weight. This reference weight signal is representative of the G forces directed along the yaw axis of the aircraft. The summed gross tank weight, divided by the "G" forces (one at straight and level flight conditions), minus the tank empty weight equals the tank net weight.

During periods of increased G forces along the yaw axis, perhaps due to turbulence or turns, the force on load cells LC1 through LC4 is exaggerated by the increased G forces. The same G forces have an equal effect on load cell LC5. Since both outputs change proportionally, the change is canceled by the division operation of U7.

Figure 5:
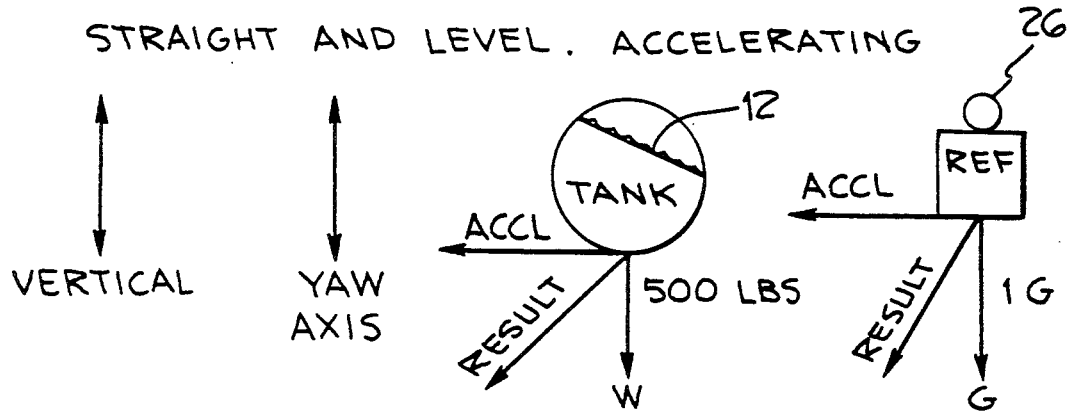

During periods of increased G forces along the roll or pitch axes, such as acceleration during takeoff, as shown in FIG. 5, the tank is acted upon by forces of gravity along the yaw axis and forces of inertia along the roll axis. Since the load cells are effected by forces along the yaw axis only, no error is introduced into the system.

Figure 6:
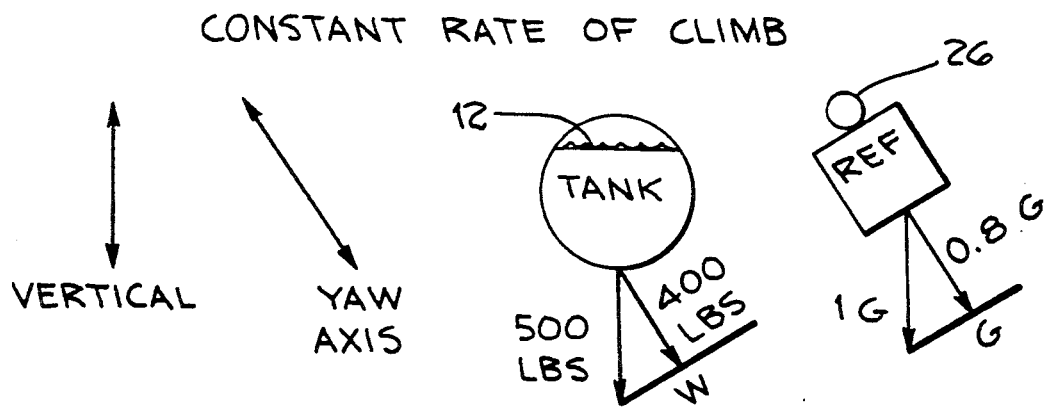

During conditions such as a constant rate climb, as shown in FIG. 6, the force on the load cells along the yaw axis is reduced as the gravity vector no longer coincides with the yaw axis. The downward force due to gravity is vertical, while the yaw axis is off of vertical, hence the gravitational force results in forces along the yaw and roll axes. Since the reduction in force on load cells LC1 through LC4 is proportional to the reduction in force on load cell LC5, it is corrected for by the division of U7.

Finally, as suggested above, during conditions of short term transients such as turbulence, the response time of the liquid in the tank, and the effects of "sloshing" would have an effect on the accuracy of this system. These short term effects are to be averaged out electronically by any of the known methods.

An embodiment of a tank assembly 100 for use in a system in accord with the present invention was constructed for experimental purposes in testing the present invention, and is illustrated in FIG. 7.

The tank assembly 100 includes: a tank 102, that is movable along one axis, preferably the yaw or vertical axis of the vehicle; a rigid guide and support structure 104; a reference weight 106 and its support mechanism 108; and four load cells generally indicated by 110.

The tank 102 has two rigid end pieces 112, each containing ball guides 114, and a transparent cylinder 116. This description is for an experimental tank assembly that has been constructed to test the present invention and may be replaced with any standard holding tank with, or without, a transparent cylindrical body. Acceptable tanks would also include spherical tanks, rectangular tanks or even irregularly shaped tanks, and tanks formed with non-transparent side walls.

The rigid support mechanism 104 is a frame 118 with guide rods 120 upon which rides the tank assembly 100. This arrangement limits movement of the tank 102 to one axis as indicated above and eliminates any load cell side loads that may otherwise be applied to the load cells if the tank assembly had freedom in additional axes. Support of the tank 102 to the frame 118 is by four weight sensing load cells 110 mounted to the bottom 122 of the frame 118.

Atop the frame 118 is a reference weight 124 mounted on guides 126 in a similar fashion as the tank 102 having a degree of freedom along the yaw or vertical axis of the vehicle, and an additional weight sensing load cell 128.

As seen from this structure, the tank assembly 100 and reference weight 124 rest or "float" on their respective weight sensing load cells along the yaw or vertical axis of the vehicle so that changes in the weight of the tank assembly or the reference weight can be immediately sensed by the weight sensing load cells.

The tank assembly 100 is for illustrative purposes only to show one embodiment of a tank assembly incorporating the present invention and should not be construed as limiting the invention to this one particular embodiment.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. An apparatus for use in measuring the volume or level of a liquid in a containment tank in a vehicle that is subject to external forces caused by movement of the vehicle having several degrees of freedom, comprising:
   a containment tank mounted to the vehicle and subject to forces along the yaw axis of the vehicle;
   a reference standard of known weight mounted to the vehicle and subject to forces along the yaw axis of the vehicle;
   at least two tank strain gauge load cells sensed by applied electrical energy for providing analog electrical outputs proportionally representing the load on each load cell, said load cells being placed intermediate separated portions of said containment tank and a portion of a common reference surface of the vehicle, said load cells being sensitive along a first axis that is substantially normal to said common reference surface and generally parallel to the yaw axis of the vehicle;
   at least one reference strain gauge load cell capable of providing analog electrical outputs proportionately representing the load on said reference load cell, said reference load cell being placed intermediate said reference standard and a portion of said common reference surface, and sensitive generally along a second axis substantially normal to said common reference surface and generally parallel to the yaw axis of the vehicle and said first axis;
   means for retaining data representative of the known tank empty weight; and,
   computational means to convert said analog electrical output signals essentially simultaneously into output information representative of the volume or level of the liquid in the containment tank by summing the plurality of tank load cell output signals to generate a tank gauge sum signal, dividing said tank gauge sum signal by the output of said reference load cell to generate a tank gross weight signal, and then subtractively combining a tank weight signal representative of the known tank empty weight with said tank gross weight signal to generate a tank net weight signal.

2. An apparatus as in claim 1, further including:
   means for electrically averaging out short term transients appearing in the analog signals as a result of inertial forces of the contents of said tank.

3. An apparatus as in claim 1, wherein said computational means further includes:
   a plurality of cell signal amplifier means, each operationally connected to a corresponding one of said plurality of tank strain gauge load cells, for amplifying the analog voltage output from said plurality of tank strain gauge load cells.

4. An apparatus as in claim 3, wherein said computational means further includes:
   a reference amplifier means operationally connected to said reference strain gauge load cell for amplifying the analog voltage output from said reference strain gauge load cell.

5. An apparatus as in claim 4, wherein said computational means further includes:
   analog multiplier means operationally coupled with said tank strain gauge load cell amplifier means and said reference strain gauge load cell amplifier means, for dividing said tank gauge sum signal by the output of said reference load cell output to generate said tank gross weight signal.

6. An apparatus as in claim 5, wherein said computational means further includes:
   subtraction amplifier means operationally coupled with said analog multiplier means and said memory means for subtractively combining said known tank empty weight signal with said tank gross weight signal to generate said tank net weight signal, and to convert said tank net weight signal to a signal representative of the volume or level of liquid in the tank.

7. An apparatus as in claim 1, further including:
   tank liquid level readout means linked to said computational means for displaying said signal representative of the volume or level of the liquid contained in said tank.

8. An apparatus for use in measuring the volume or level of a liquid in a containment tank in a vehicle that is subject to external forces caused by movement of the vehicle, comprising:
   a containment tank mounted to the vehicle and movable along the yaw axis of the vehicle;
   a reference standard of known weight mounted to the vehicle and movable along the yaw axis of the vehicle;
   a plurality of tank strain gauge load cells sensed by direct current voltage means providing analog voltage outputs in proportion to the load on each load cell, said plurality of load cells being placed intermediate different portions of said containment tank and a portion of a common reference surface of the vehicle, and sensitive along a first axis that is substantially normal to said common reference surface and generally parallel to the yaw axis of the vehicle;
   at least one reference strain gauge load cell providing analog voltage outputs in proportion to the load on said reference cell, said reference cell being placed intermediate said reference standard and a portion of said common reference surface, and aligned generally parallel to a second axis that is substantially normal to said common reference surface and substantially parallel to said first axis and the yaw axis of the vehicle;
   means to convert the analog voltage outputs from said tank load cells and from said reference load cell into digital signals;
   correcting means for retaining data representative of the known tank empty weight; and,
   computational means to convert the digital signals essentially simultaneously into output information representative of the volume or level of the liquid in the containment tank by summing the plurality of tank load cell outputs to form a summed signal, dividing said summed signal by the output of said reference load cell to generate a tank gross weight signal, and then subtractively combining a known tank empty weight signal representative of the known tank empty weight from said correcting means with said tank gross weight signal to generate a tank net weight signal.

9. A method for use in measuring the volume or level of a liquid in a containment tank in a vehicle that is subject to external forces caused by movement of the vehicle, comprising the steps of:

mounting a containment tank to the vehicle so that it is movable along the yaw or vertical axis of the vehicle;

mounting a reference standard of known weight to the vehicle so that it is movable along the yaw or vertical axis of the vehicle;

placing a plurality of tank strain gauge load cells sensed by direct current voltage means providing analog voltage outputs in proportion to the load on each load cell, intermediate different portions of said containment tank and a portion of a common reference surface of the vehicle, and sensitive along an axis substantially normal to said common reference surface and generally parallel to the yaw axis of the vehicle;

placing at least one reference strain gauge load cell sensed by direct current voltage means providing analog voltage outputs in proportion to the load on the load cell intermediate said reference standard of known weight and a portion of said common reference surface of the vehicle, and sensitive generally parallel along an axis substantially normal to said common reference surface and generally parallel to the yaw axis of the vehicle; and, converting the analog signals, essentially simultaneously, into output information representative of the volume or level of the liquid in the containment tank by summing the plurality of tank load cell outputs to form a sum signal, dividing said sum signal by the output of said reference load cell output to form a tank gross weight signal, and then subtractively combining a known tank empty weight signal representative of the known tank empty weight with said tank gross weight signal to generate a tank net weight signal.

10. A method for use in measuring the volume or level of a liquid in a containment tank in a vehicle subject to external forces caused by movement of the vehicle, comprising the steps of:

mounting a containment tank to the vehicle so that it is movable along the yaw or vertical axis of the vehicle;

mounting a reference standard of known weight to the vehicle so that it is movable along the yaw or vertical axis of the vehicle;

placing a plurality of tank strain gauge load cells sensed by direct current voltage means providing analog voltage outputs in proportion to the load on each load cell, intermediate different portions of said containment tank and a portion of a common reference surface of the vehicle, and aligned along an axis substantially normal to said common reference surface and generally parallel to the yaw axis of the vehicle;

placing at least one reference strain gauge load cell sensed by direct current voltage means providing analog voltage outputs in proportion to the load on the load cell, intermediate said reference standard of known weight and a portion of said common reference surface, and aligned generally parallel along an axis substantially normal to said common reference surface and generally parallel to the yaw axis of the vehicle;

converting the analog voltage outputs from the tank load cells and from the reference load cell into digital signals;

converting the digital signals, essentially simultaneously, into output information of the volume or level of the liquid in the containment tank by summing the plurality of tank load cell outputs to form a sum signal, dividing said sum signal by the output of said reference load cell output to form a tank gross weight signal, and then subtractively combining a known tank empty weight signal representative of the known tank empty weight with said tank gross weight signal to generate a tank net weight signal; and, converting said tank net weight signal into a liquid level signal corresponding volume or level of liquid contained in the tank.

11. An apparatus for use in measuring the weight of a liquid in a containment tank in a vehicle that is subject to external forces caused by movement of the vehicle having several degrees of freedom, comprising:

a containment tank mounted to the vehicle and subject to forces along the yaw axis of the vehicle;

a reference standard of known weight mounted to the vehicle and subject to forces along the yaw axis of the vehicle;

at least two tank strain gauge load cells located intermediate separated portions of said containment tank and a portion of a common reference surface of the vehicle, for providing analog electrical load outputs proportionally representing the load on each load cell, said load cells being sensitive along a first axis that is substantially normal to said common reference surface and generally parallel to the yaw axis of the vehicle;

at least one reference strain gauge load cell located intermediate said reference standard and a portion of said common reference surface, for providing analog electrical reference outputs proportionately representing the load on said reference load cell, said reference load cell being sensitive generally along a second axis substantially normal to said common reference surface and generally parallel to the yaw axis of the vehicle and said first axis; and, computational means coupled to receive said load output signals and said reference output signals, for summing said load signals to generate a sum signal, dividing said sum signal by said reference signal to generate a tank gross weight signal, and for subtractively combining an applied tank weight signal representative of the known tank empty weight with said tank gross weight signal to generate a tank net weight signal.

* * * * *